United States Patent Office 3,305,248
Patented Feb. 21, 1967

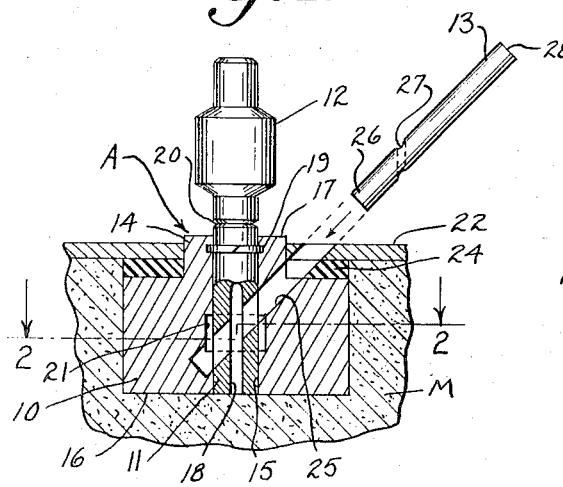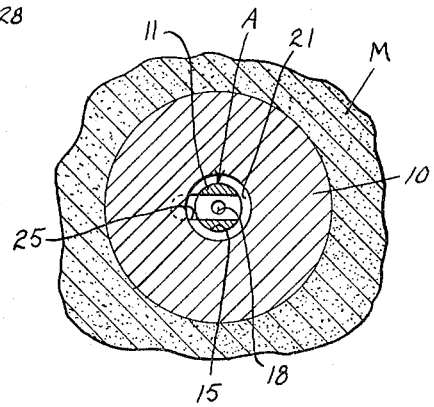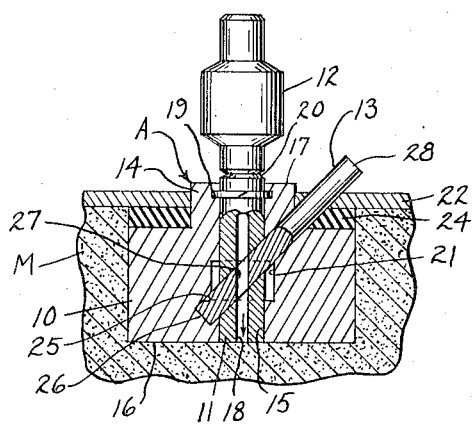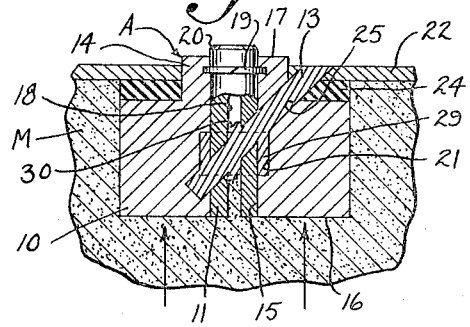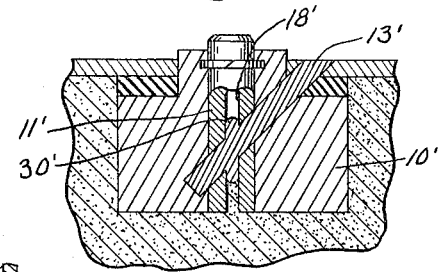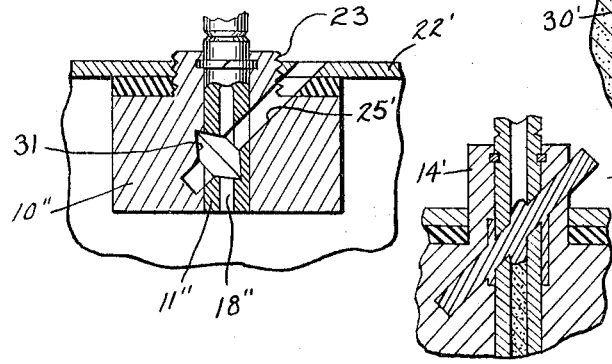
INVENTOR
EDWARD R. MARGIS
BY George W. Wright, Jr.

3,305,248
INJECTION FITTING
Edward R. Margis, 5011 N. Palisades Road,
Whitefish Bay, Wis. 53217
Filed Nov. 30, 1964, Ser. No. 414,688
3 Claims. (Cl. 285—4)

This invention appertains broadly to filling and closing, and more particularly to new and useful improvements in an injection pressurization fitting.

There are many instances wherein it is a desirable to pressurize a chamber or container, and after a certain pressure has been reached, to seal the same and thus maintain the pressure.

The present invention relates to a fitting which is capable of many uses, but is primarily designed to be utilized with the coupling and gripping member shown and described in my application entitled, "Coupling and Sealing Structures," filed on an even date herewith.

In my co-pending application, Serial No. 414,690, I have described a novel coupling member and method for joining pipes and other members, wherein a cylindrical sleeve of a cold flow material is utilized and by exerting pressure thereon the material is caused to flow and to unite the gripped members. The material utilized to exert pressure has been described primarily as a putty-like material, and when the correct pressure has been exerted the pressure should be maintained and this is accomplished through the fitting. While other types of fittings may accomplish their purpose, it is desirable, to insure a permanent seal, that the fitting be of the type that will give a permanent and lasting seal, and it is also desirable that means be provided in addition to the initial securing of the fitting of the shell of the chamber to lock the fitting permanently in place.

It is, therefore, a primary object of my present invention to provide an injection pressurized fitting which will allow the pressurization of a chamber or container and which is capable of being permanently sealed while the pressure is maintained and thus maintain the sealed chamber or container under constant pressure.

Another important object of my present invention is to provide a novel fitting of the above character wherein the means for permanently sealing the fitting also aids in locking the fitting to the chamber walls.

A further object of my present invention is to provide an injection pressurization fitting having initial means allowing the material to enter the chamber under pressure and having means initially maintaining the pressure and then providing additional means for permanently sealing and locking the fitting in place.

A more specific object of my invention resides in providing a fitting of the above character wherein the fitting body is provided with a longitudinally extending axial bore receiving and holding a valve-like stem carrying means for initially injecting material under pressure though the fitting body and providing a deformable pin extending angularly in the fitting body and through the stem, the pin having means to provide an aligned opening or port with the passageway of the stem, the pin then being deformed by either an explosive force or by a ram, so that the material flows and fills the cavities in the body stem and shell to permanently seal and lock the fitting in place.

Still another object of my present invention is to provide a fitting wherein the pin extends angularly only through the body of the fitting and the stem.

A further object of my present invention is to provide a fitting of the above character, wherein means is provided to remove the upper portion of the fitting after the fitting has been permanently sealed and locked.

A still further object of my present invention is to provide a simple, practical and reliable construction that is economical to manufacture, easy to assemble and positive in its operation.

With the above and other objects in view, which will more readily appear as the nature of the invention is better understood, the same consists in the novel construction, combination and arrangement of parts hereinafter more fully described, illustrated and claimed.

A preferred and practical embodiment of my invention is shown in the accompanying drawings, in which, FIGURE 1 is a side elevational view of my novel fitting, partly in section, the section being a vertical section through the fitting and a fragmentary sectional view through the container;

FIGURE 2 is a horizontal section taken on the line 2—2 of FIGURE 1 of the drawings, and looking in the direction of the arrows;

FIGURE 3 is a view similar to FIGURE 1 of the drawings but showing the pin in its operative position to allow the material to enter the chamber;

FIGURE 4 is a view similar to FIGURES 1 and 3 of the drawings with the upper portion of the fitting removed and the pin deformed to permanently seal and lock the fitting to the chamber shell or wall;

FIGURE 5 is a view similar to FIGURE 4 of the drawings but showing a slight modification of the fitting;

FIGURE 6 is a view similar to FIGURE 1 of the drawings, but showing a further modification of the fitting, and FIGURE 7 illustrates a still further modification wherein a reduced section of the body extends well beyond the outer casing.

Referring now to the drawings in detail, wherein similar reference characters designate corresponding parts throughout the several views, the letter A generally indicates one type of my improved fitting for the pressurization of the interior of a container or chamber. The fitting A includes broadly a lower annular shaped body 10, the stem 11, upper connector member 12 and a deformable pin 13.

The fitting A is generally adaptable to any type of container wherein the interior is under pressure, but as previously set forth, this fitting is particularly adapted to be used with the invention of my co-pending application and to pressurize the interior of the coupling and gripping member described therein. For this purpose, therefore, means is provided for the entrance of a material M under pressure and means must be provided to maintain the pressure within the chamber until a permanent and effective seal is had. In accordance therewith the lower annular body 10 is provided with an upper reduced section 14 formed in alignment with the axial center of the body 10. Through the entire body 10 and its reduced section 14, I provide an axially extending bore 15. Snugly received within the bore 15 is the aforementioned stem 11 and preferably the lower end termination of the stem 11 is flush with the bottom wall 16 of the body 10 but the upper end termination of the stem extends beyond the upper wall 17 of the reduced section 14. This stem 11 is snugly received within the bore 15 and is in turn provided with an axially extending passageway 18 and the stem is initially held against movement in the bore 15 by a snap ring 19 positioned in suitable grooves provided both in the stem and the reduced section 14. The connector member 12 may be formed integral with the stem 11 and if so, a portion 20 joining the two is weakened so that after the pressurization of the chamber or container the connector member 12 can be disengaged therefrom. It should be apparent that in lieu of the weakened portion 20, the connector member 12 may be joined to the stem 11 by the provision of screw threads. In any event, the connector member 12 is utilized as a means providing for the injection of the material M under pressure into the container, and while the construction of the connector member does not form a material part of the invention, preferably it is of the type having a spring pressed ball valve arrangement, the ball being unseated under pressure from the material entering the chamber and seated by means of the spring. However, if desired the connector member 12 may merely include a passageway in open communication with the passageway 18 of the stem 11 and then pressure must be maintained until the pin 13 is deformed to provide a permanent seal.

In the form of the invention illustrated in FIGURES 1 to 4 of the drawings, the annular body member 10 is provided with an enlarged chamber 21 intermediate its ends and in open communication with the axially extending bore 15. Further, the entire fitting is assembled with the stem, annular body and connector member as shown in FIGURE 1 of the drawings, and during the assembly of the chamber or container to be pressurized, the reduced portion 14 is fitted through the aperture provided for in the outer shell or casing. Initially, the fitting can be held to the chamber in any desired manner, such as overlapping the upper end termination of the reduced section 14 or by providing threads 23 as illustrated in FIGURE 6 of the drawings. In order to provide a more perfect seal, I also include an annular shape gasket or sealing member 24, which is interposed between the outer shell or casing 22 and the body 10 and slipped about the reduced section 14.

It is very often desirable to provide a permanent seal to the container and particularly when the fitting is utilized with the device described in my co-pending application the seal should be permanent and should also aid in further locking the stem to the body and securing the entire fitting to the casing 22. In order to accomplish this, I provide an angularly extending opening 25 and this opening is preferably drilled through the casing 22, sealing member 24, body 10, stem 11 and particularly it must communicate with the interior chamber 21. Thus, the angle at which the opening is drilled is predetermined so that it will intersect these members as shown in FIGURES 1 to 4 of the drawings. The inner diameter of this opening is of a size and configuration to receive the deformable pin 13 and a portion 26 of this pin should extend into and adjacent the lower portion of the body 10 and beyond the interior chamber 21. For this purpose, pin 13 is provided with a port 27 drilled or otherwise formed through the pin at an angle to the axial center thereof so that when the pin is in position as illustrated in FIGURE 3 of the drawings, the port 27 will be in alignment with passageway 18 and the pin is of such a length that its outer end 28 extends well beyond the outer casing or shell 28. Thus, with the fitting in position as illustrated, the material M can be forced into the chamber under pressure and when the chamber is filled and the proper pressure reached, this pressure is then maintained until the pin is deformed, as shown in FIGURE 4 of the drawings to completely seal and close the passageway 18. As the connector member 12 is provided with the aforementioned spring pressed ball valve, the element used to induce the material M into the fitting can be removed and the ball valve will close and the initial pressure will be maintained. Pin 13 is deformed by any desired means but sufficient force must be exerted so that material 29 from the pin will completely fill the interior chamber 21 and material 30 will fill in and close the passageway 18. Thus it can be seen that not only does pin 13 effectively and permanently seal the passageway 18 but the pin also aids in locking the stem 11 to the body 10 and further, the upper portion of the pin aids in holding the entire fitting to the casing or shell 22 (FIGURE 4).

After the interior of the container or chamber, as the case may be, is fully pressurized and sealed, the connector member 12 is removed either by knocking the same off and breaking he connection in the weakened portion 20, or by unthreading the connector, and any excess in the top of the pin 28 is trimmed off so that the fitting now lies substantially flush with the outer surface of the shell or casing 22. The fitting body is also aided in maintaining its seal under pressure since the force is exerted against the bottom 16 thereof in direction of the arrows FIGURE 4 of the drawings, and thus, the seal provided by the gasket or sealing member 24 becomes more effective.

From the description thus far, it should be readily apparent that the deformable pin 13 forms a most important part of the present invention, since not only does it provide an effective and permanent seal but also aids in locking the stem to the body and reducing the force exerted on the split ring 19 and materially aids in the proper location and holding of the entire assembly to the outer shell or casing 22. As I indicated, considerable force should be exerted against the upper portion 28 of the pin to properly deform and cause the material to flow in the desired places. In accomplishing this, I prefer to utilize a well known explosive charge, but obviously, I may utilize any number of hydraulically or pneumatically operated tools to force the pin into the chamber 21 and passageway 18.

While in the preferred form of the invention I utilize an interior chamber 21 communicating with the bore 15, in some instances this chamber can be eliminated and in FIGURE 5 of the drawings, I have shown a modification wherein the lower body 10′, stem 11′ and pins 13′ are formed substantially identical to that form of the invention shown in FIGURES 1 to 4 of the drawings, but I have eliminated the intermediate chamber 21 in the body 10. Thus, after the proper pressurization of the chamber or container, pin 13′ is deformed and material 30′ will flow only within the passageway 18′ to effectively seal the same and since the pin extends angularly across the stem 11, it also aids to hold and lock the pin in place.

The formation of the interior chambers within the body 10 can take any of a number of shapes, and therefore, it should be unnecessary to illustrate a great number; however, in FIGURE 6 I have shown a preferred modification of the interior chamber, and again, as in FIGURE 1 to 4, and FIGURE 5, all major elements of my fittings are identical. In the angularly extending passageway 25′ of this form of the invention, I form a mushroom-shaped interior chamber 31 and actually, this chamber takes the shape of imposed conically shaped members, part of which are milled or otherwise formed in the body 10″ and stem 11″, as illustrated. Thus, when the pin 13 is deformed, it will fill in the mushroom shaped chamber 31 and also flow into the passageway 18″.

In the three forms of the invention illustrated, the angularly extending passageway is drilled through the outer casing, gasket, body and stem, as shown, so that the pin 13 aids in holding or positioning the fitting to the well of the container or chamber. However, in some instances, it may not be desirable to drill through the casing for the insertion of the pin, and as shown in FIGURE 7, the reduced portion 14′ of the body 10 may be extended so that it projects well beyond the outer casing and then the passageway is drilled through the extended portion of the reduced section 14′ and stem without the necessity of disturbing or drilling through the outer casing of the container or chamber. Of course, this form of the invention has the disadvantage of a major portion of the reduced section 14′ extending well beyond the outer casing.

It should also be noted that in FIGURES 1 to 5 of the drawings, I have illustrated the pressurizing material M within the chamber or container. In FIGURE 6 I have shown the modified fitting associated with the outer wall 22′ prior to the injection of the material for pressurizing the interior of the device.

From the foregoing, it is believed that the features and advantages of my invention will be readily apparent to those skilled in the art, and it should be particularly noted that the fitting may be made in various sizes to accommodate either the coupling of pipes or the joining together of electric wiring and the like, in which latter case the size would be in the nature of the diameter of a conventional pencil eraser.

Thus, while I have shown and described certain specific embodiments of my invention, it will be understood that these embodiments are merely for the purpose of illustration and description, that various other forms may be devised and that changes may be made in the proportions, and minor details of construction, without departing from the spirit of the invention or scope of the appended claims.

I claim:

1. In combination with a fluid tight chamber to be pressurized, an injection pressurized fitting adapted to be associated with the outer casing of said chamber including, an annular lower body, a reduced section on one end of said body about its axial center, said reduced section and lower body forming a shoulder therebetween, the outer casing of said chamber being provided with an aperture, said annular lower body position within said chamber and said reduced section extending through said aperture, said shoulder portion providing means to restrain said lower body within said chamber and means to seal said fitting to said outer casing, said body and reduced section having a bore extending axially throughout its entire length, a stem snugly received in said bore and having one end terminating above said reduced section of said body, said stem having an axially extending passageway therethrough, means adjacent the upper end of said stem for connection with the source of pressurization and for allowing the injection of a pressurization material therethrough, a deformable pin extending angularly through said body and stem, the portion of said pin adjacent the passageway being provided with a port in alignment with and in communication with said passageway, and said pin being capable of deforming to close said port and to flow into said passageway.

2. A fitting as set forth in claim 1, wherein said body is provided with an enlarged annular chamber intermediate its length and communicating with said axially extending bore and through which said pin extends.

3. A fitting as set forth in claim 1, wherein said means adjacent the upper end of said stem for allowing the injection of a pressurization material includes, a connector member having an axially extending passageway in communication with the passageway of said stem, said connector member being adapted to be disengaged from said stem and fitting after said fitting has been sealed and locked.

References Cited by the Examiner

UNITED STATES PATENTS

| | | | |
|---|---|---|---|
| 837,767 | 12/1906 | Aims | 61—45 |
| 1,971,649 | 8/1934 | Furman et al. | 29—520 |
| 2,083,842 | 6/1937 | Henning | 285—3 |

CARL W. TOMLIN, *Primary Examiner.*

D. W. Arola, *Assistant Examiner.*